United States Patent [19]

Okawa et al.

[11] Patent Number: 4,579,549
[45] Date of Patent: Apr. 1, 1986

[54] CONTINUOUSLY VARIABLE TRANSMISSION MEANS

[75] Inventors: Susumu Okawa, Numazu; Hideaki Matsui, Gotenba, both of Japan

[73] Assignee: Toyota Jidosha Kabushiki Kaisha, Japan

[21] Appl. No.: 515,133

[22] Filed: Jul. 19, 1983

[30] Foreign Application Priority Data

Jul. 23, 1982 [JP] Japan .................. 57-129175

[51] Int. Cl.4 ............................................. F16G 1/21
[52] U.S. Cl. .................................................. 474/242
[58] Field of Search ................. 474/242, 244; 29/450, 29/525

[56] References Cited

U.S. PATENT DOCUMENTS 3,720,113 3/1973 Doorne et al. ............. 474/242
3,887,992 6/1975 Parmann ..................... 29/450
3,949,621 4/1976 Beusink et al. ............. 474/242 X
4,302,874 12/1981 Colas .......................... 29/525 X
4,328,983 5/1982 Gibson ........................ 29/525 X
4,347,219 8/1982 Noritake et al. ............. 29/525 X
4,427,401 1/1984 Hendriks et al. ........... 474/242 X Primary Examiner—James A. Leppink
Assistant Examiner—Frank McKenzie
Attorney, Agent, or Firm—Parkhurst & Oliff

[57] ABSTRACT

A belt means for transmitting torque between pulleys in a continuously variable transmission. The belt means comprises a plurality of abutting hoops superimposed inside of each other, with no clearance being provided between abutting hoops because the outer circumferential diameter of an inner hoop is greater than or equal to an inner diameter of an outwardly located hoop, whereby, the tensile stresses on the innermost hoop are decreased to enhance the durability and increase the service-life of the inner hoop.

3 Claims, 6 Drawing Figures

CONTINUOUSLY VARIABLE TRANSMISSION MEANS

BACKGROUND OF THE INVENTION

The present invention relates to a continuously variable transmission means for transmitting torque from a driving pulley to a driven pulley, each of pulleys having surfaces of a generally V-shaped cross-section.

Such a continuously variable transmission means is known in the form of a rubber V-belt which acts as a torque transmitting element. A rubber V-belt, however, has its restrictions as to the strength of the material employed. Such a transmission means with a V-belt extending between two pulleys enables control of the number of revolutions of the driven pulley to be effected, by varying the size of a V-shaped opening(s) in one or both of the pulleys or by varying the pressure with which the belt is forced into the opening. Thus, the position of the belt on the pulley and the effective diameter of the pulley can be varied and it is possible to vary the ratio of the input and output number of revolutions continuously.

It is also known to form a continuously variable transmission means from a predetermined number of metallic hoops, on which longitudinally shiftable V-shaped members are mounted, the members linking up and extending around the total circumference of the hoops. In this known construction, the flexible continuous member consists of a carrier which comprises a plurality of hoops superimposed with some clearances, the innermost one lying on a rounded topside of each of a plurality of V-shaped blocks made of metal, such as steel. Driving force is transmitted from the driving pulley to the driven pulley by the movement of V-shaped members. As the innermost metallic hoop has metal contact with the moving V-shaped blocks, the hoop is subjected to tensile force from the blocks when the blocks are shiftable. Disadvantages of this construction are that the innermost hoop is subjected to the biggest tensile stress in all the hoops.

SUMMARY OF THE INVENTION

The present invention was made in view of the above background. It is accordingly an object of the invention to provide a continuously variable transmission means in which the stress of the innermost hoop is decreased.

To obtain the above object, a continuously variable transmission means for transmitting torque between V-shaped pulleys, comprising:

a plurality of metallic hoops, each of the hoops whose outer circumferential diameter is adapted to be larger than an inner circumferential diameter of abutting outer hoops;

a plurality of V-shaped members shiftable in the longitudinal direction along the hoops, the members linking up and extending around the total circumference of the hoops, the members having V-shaped blocks made of non-compressible material so that the torque is substantially transmitted by the compressive stress through the blocks.

BRIEF DESCRIPTION OF THE DRAWINGS

The above object, features and advantages of the present invention will become more apparent from reading the following description of the preferred embodiment taken in connection with the accompanying drawings in which.

DETAILED DESCRIPTION OF THE PREFERRED EMBODIMENTS

The present invention will be described in detail with reference to the accompanying drawings which illustrate a form of a flexible continuous power transmission means according to the present invention.

Figure 1:
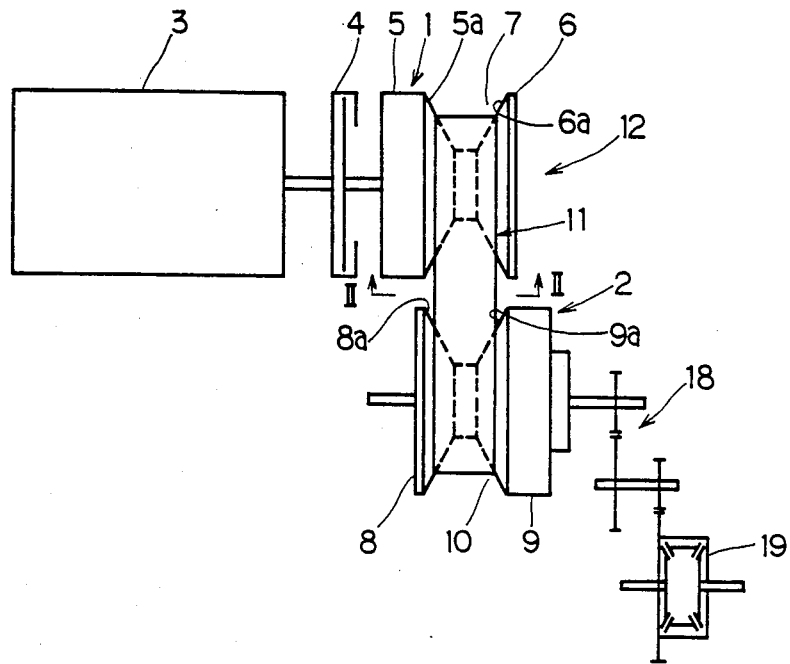
FIG. 1 is a schematic view of a driving mechanism in which the present invention is applied.

Referring now to the drawings wherein similar reference characters designate corresponding parts throughout several views, FIG. 1 shows a schematic view of a driving mechanism in which the invention is applied. An output shaft of a power source 3 such as an engine is connected with a driving member of a clutch 4. A driven member of the clutch 5 is connected with an input shaft of a continuously variable transmission 12. The driving force of the power source 3 is transmitted though the clutch 4 to the transmission 12. The transmission 12 includes a V-shaped belt pulley 1 coaxially provided to the clutch 4 and a V-shaped belt pulley 2 provided in parallel with the pulley 1. The pulley 1 has a movable portion 5 and a fixed portion 6. A V-shaped circumferential groove 7 is formed between the movable and fixed portion 5 and 6. The numerals 5a, 6a designate driving faces of the pulley 1 which contact the V-shaped belt. The driven portion 2 has a fixed pulley 8 and a movable portion 9, the movable portion 9 being actuated by an hydraulic cylinder. A V-shaped circumferential groove 10 is formed between the movable and fixed portions 9 and 10. The numerals 8a, 9a designate follower faces of the pulley 2. A driving belt 11 is fitted between the grooves 7 and 10 to transmit the torque of the driving pulley 1 to the driven pulley 2. An output shaft of the movable portion 9 is connected through a gear train 18 with a final driving gear 19 whose output is transmitted to wheels (not shown in drawings).

The movable portions 5 and 9 of the driving and driven pulleys 1 and 2, respectively, are adapted to change the width thereof by an hydraulic actuator means, whereby the torque of the power source 3 is transmitted with a continuously variable speed reduction.

Figure 2:
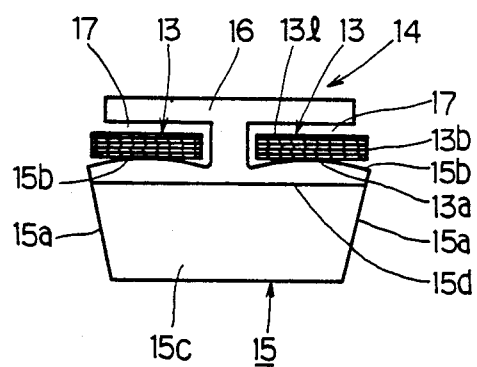
FIG. 2 is a cross-sectional view of a V-shaped block.
Figure 3:
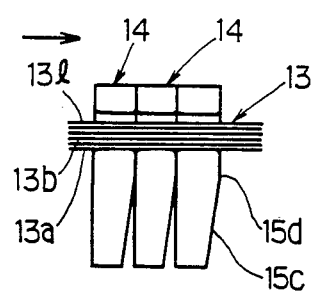
FIG. 3 is a side view of a V-shaped block.

Referring next to FIGS. 2 and 3, there is illustrated a V-shaped block 14. The block 14 comprises a T-shaped top portion 16 and a main portion 15 to which the portion 16 extends. A groove 17 for allowing a carrier 13 therein is provided between the portions 16 and 15. The carrier 13 comprises a plurality of hoops $13a$, $13b$ ... $13l$ superimposed with no clearance between them. The shape of the portion on which the carrier 13 is lying is rounded at portion $15b$. The numeral $15a$ designates a side face of the block 14, and $15c$ designates an inclined face of the block 14.

Figure 5:
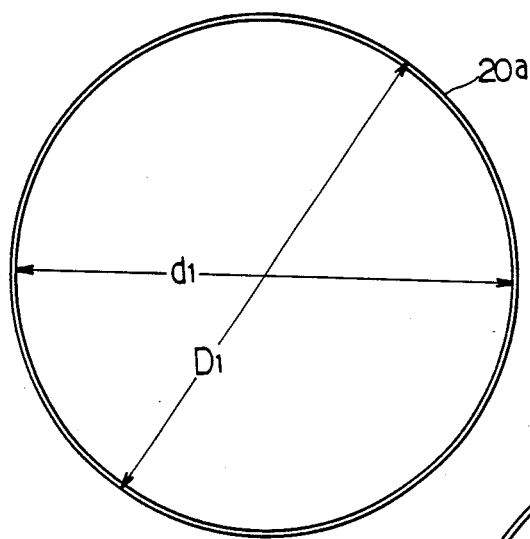
FIG. 5 is an enlarged view illustrating hoops.
Figure 5:
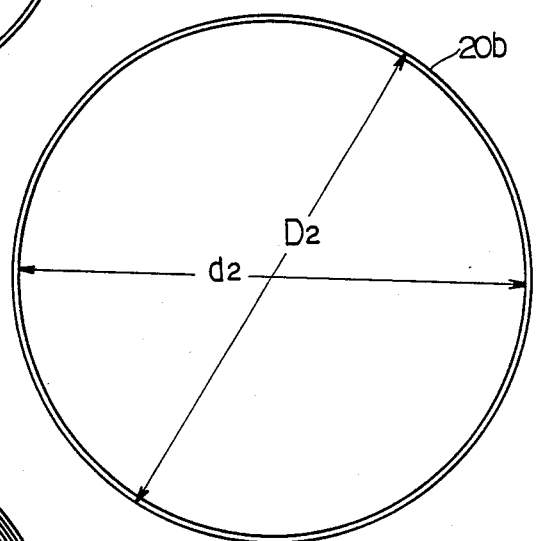
Figure 5:
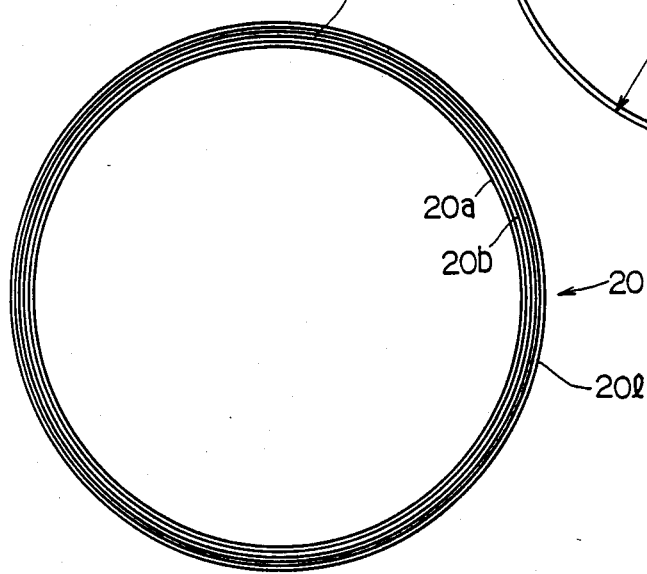

FIG. 5(a) indicates the innermost hoop $13a$ which has the outer circumferential diameter $D_1$ and the inner circumferential diameter $d_1$. FIG. 5(b) illustrates an outer hoop 13b which positions in a place abutting on the inner hoop 13a. FIG. 5(c) indicates the carrier 20 consisting of a plurality of hoops 13a, b . . . 1. Each of hoops 13a, b . . . 1 is annular as disclosed in FIGS. 5(a), 5(b). The reference $D_2$ indicates the outer circumferential diameter, and the reference $d_2$ indicates the inner circumferential diameter. The diameter $D_1$ is adapted to be equal to or more than the diameter $d_2$. Further, the diameter $D_2$ is adapted to be equal to or more than the inner circumferential diameter of the hoop 13c which abuts on the hoop 13b. Thus, the outer circumferential diameter of the inner hoop is equal to or greater than the inner circumferential diameter of the outer hoop.

The carrier 13 consisting of a plurality of hoops described above is fitted into the groove 17 and extends between the pulleys 1, 2.

Figure 4:
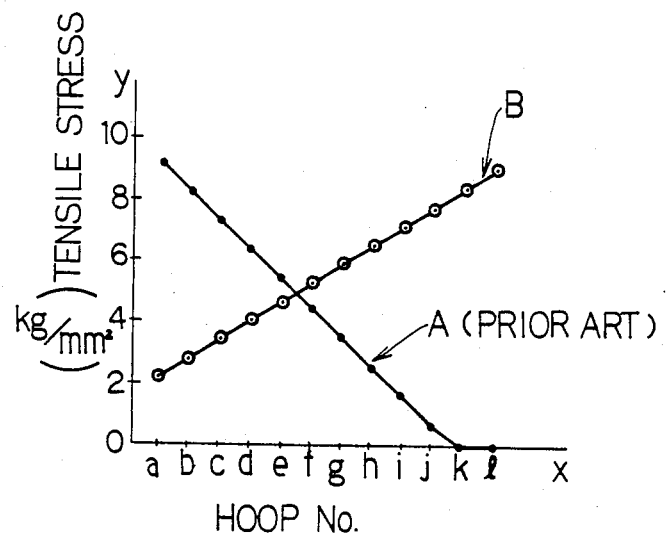
FIG. 4 is a diagram illustrating stress applied to hoops of a flexible continuous power transmission means.

In operation of the flexible continuous power transmission means, a driving torque of the power source 3 is transmitted to the pulley 1 when the clutch 4 is engaged. The torque of the pulley 1 is transmitted to the pulley 2 through the belt 11. The torque of pulley 1 is transmitted to the belt 11 by the frictional force caused between the side faces 15a of the block 14 and the faces 5a, 6a of the pulley 1. At this condition, the torque is transmitted by the shiftable movement of V-shaped members from the driving pulley 1 to the driven pulley 2. The metallic hoop is contacted with the moving V-shaped members. Thereby, the hoops are subjected to tensile forces from the members. The magnitude of the tensile forces vary with loads applied to the continuously variable transmission 12. There is no clearance provided between hoops, and the tensile stresses of the hoops, having no clearances therebetween, caused by the tensile forces acting thereupon is illustrated by Line B in FIG. 4. As shown in FIG. 4, the tensile stresses of the hoops according to the invention increases with the increases of the diameter thereof. That is, the tensile stresses experienced by the outermost hoop 13l is the greatest and the tensile stresses experienced by the innermost hoop 13a is the smallest. On the other hand, the tensile stresses experienced by hoops according to the prior art, which have clearances 30$\mu$ between abutting hoops, is illustrated by Line A in FIG. 4. The stresses experienced by the hoops according to the prior art is the greatest at the innermost hoop 13a and the stress experienced by the innermost hoop is about 9 kg/mm$^2$. According to the increase of the diameter of hoops, the amount of the stress experienced by the hoops decreases to a value of zero in the case of hoop 13k.

Figure 6:
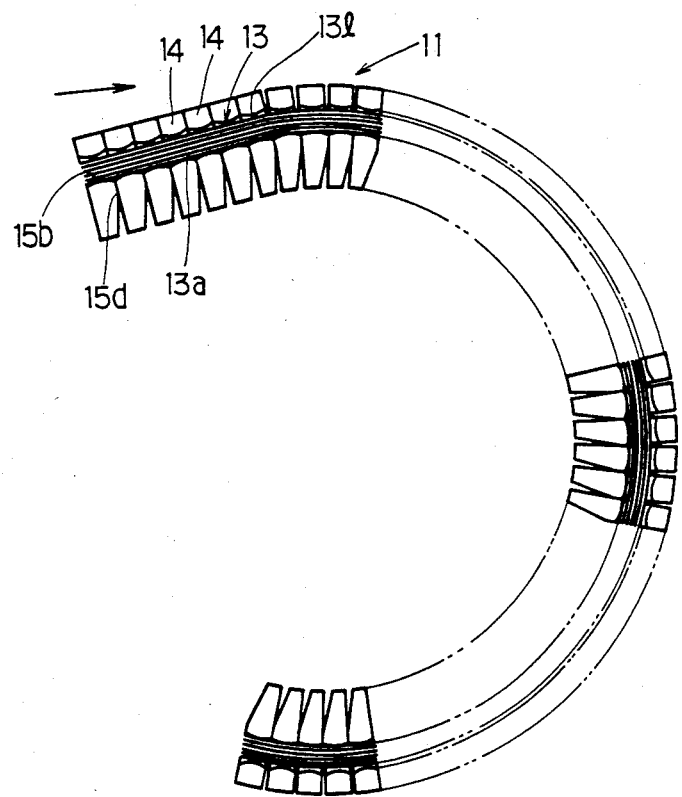
FIG. 6 is a partial view of driving mechanism illustrating V-shaped members at the curved position around a pulley.

Further, the innermost hoop 13a is subjected to a frictional force which results from the following interactions. FIG. 6 shows that when the blocks 14 bend around the pulleys 1 and 2, the rotation center of blocks 14 moves from the point where the hoop 13a contacts with the upper face 15b, to the upper rim 15d of the inclined face. The rotation radius of the blocks is adapted to be smaller than that of the hoops. This results in sliding between the carrier 13 and the portion of the blocks which are in contacting engagement with the carrier to create a frictional force. Consequently, the innermost hoop 13a is subjected to both tensile forces and frictional forces, the frictional forces resulting from the sliding engagement between the carrier 13 and the blocks 14. This results in accelerated degradation of the innermost hoop 13a. However, when As the tensile forces applied to the innermost hoop 13a are decreased, the total amount of forces, and resultant stresses, applied to the hoop 13a decrease. Thereby, the durability and expected service life of the innermost hoop 13a is enhanced.

In the above embodiments, the hoop is described as being in a circular form. In the case that the form of hoops is not circular, the abovediscussed desirable effect can be achieved by providing the outer peripheral length of the inner hoop to be longer than the inner peripheral length of the abutting outer hoop.

While the present invention has been described in its preferred embodiments, it is to be understood that the invention is not limited thereto and may be otherwise embodied within the scope of the following claims.

What is claimed is:

1. A belt means for transmitting torque between V-shaped pulleys in a continuously variable transmission, comprising:

a plurality of concentric metallic hoops, each of said hoops having an inner circumferential diameter and an outer circumferential diameter, such that an inner circumference diameter of a metallic hoop which is outwardly located with respect to an abutting metallic hoop is held in contacting engagement with an outer circumference of said abutting metallic hoop by providing the outer circumferential diameter of said abutting metallic hoop being greater than said inner circumferential diameter of said outwardly located metallic hoop; and a plurality of V-shaped members being located upon said belt means, such that the V-shaped members shift along a circumference of said plurality of metallic hoops, said V-shaped members linking up and extending around a total circumference of said hoops, said V-shaped members having V-shaped blocks made of a non-compressable material, such that the torque is substantially transmitted by compressive stresses through said V-shaped blocks to said V-shaped pulleys.

2. The belt means of claim 1, wherein the outer circumferential diameter of the abutting metallic hoop is 20 $\mu$m longer than the inner circumferential diameter of said outerwardly located metallic hoop.

3. A belt means for transmitting torque between V-shaped pulleys in a continuously variable transmission, comprising:

a plurality of concentric metallic hoops, each of said hoops having an inner circumferential diameter and an outer circumferential diameter, such that an inner circumference diameter of a metallic hoop which is outwardly located with respect to an abutting metallic hoop is held in contacting engagement with an outer circumference of said abutting metallic hoop by providing the outer circumferential diameter of said abutting metallic hoop to be equal to said inner circumferential diameter of said outwardly located metallic hoop; and a plurality of V-shaped members being located upon said belt means, such that the V-shaped members shift along a circumference of said plurality of metallic hoops, said V-shaped members linking up and extending around a total circumference of said hoops, said V-shaped members having V-shaped blocks made of a non-compressable material, such that the torque is substantially transmitted by compressive stresses through said V-shaped blocks to said V-shaped pulleys.

* * * * *